(12) United States Patent
Gits et al.

(10) Patent No.: US 7,088,809 B1
(45) Date of Patent: Aug. 8, 2006

(54) CALL SCREENING AGENT

(75) Inventors: Peter M. Gits, Clarendon Hills, IL (US); Dale J. Seavey, Sunol, CA (US)

(73) Assignee: Cisco Technology, Inc., San Jose, CA (US)

( * ) Notice: Subject to any disclaimer, the term of this patent is extended or adjusted under 35 U.S.C. 154(b) by 286 days.

(21) Appl. No.: 10/632,253

(22) Filed: Aug. 1, 2003

(51) Int. Cl.
*H04M 3/42* (2006.01)
*G06F 15/16* (2006.01)

(52) U.S. Cl. .......................... 379/201.01; 379/220.01; 709/205

(58) Field of Classification Search ............... 379/67.1, 379/88.16, 88.22, 211.02, 220.01, 221.01, 379/201.01; 709/205
See application file for complete search history.

(56) References Cited

U.S. PATENT DOCUMENTS

| | | | |
|---|---|---|---|
| 6,182,059 B1 | 1/2001 | Angotti et al. ................. 706/45 |
| 6,236,983 B1 | 5/2001 | Hofmann et al. .............. 706/47 |
| 6,411,696 B1 | 6/2002 | Iverson et al. .......... 379/201.06 |
| 6,411,947 B1 | 6/2002 | Rice et al. ..................... 706/47 |
| 6,510,509 B1 | 1/2003 | Chopra et al. ................ 712/13 |
| 6,598,034 B1 | 7/2003 | Kloth .......................... 706/47 |
| 6,665,537 B1 | 12/2003 | Lioy ........................... 455/435 |
| 6,915,285 B1* | 7/2005 | Gray et al. ................... 706/49 |
| 2004/0083479 A1* | 4/2004 | Bondarenko et al. ........ 719/310 |

* cited by examiner

*Primary Examiner*—Ovidio Escalante
(74) *Attorney, Agent, or Firm*—Baker Botts L.L.P.

(57) ABSTRACT

A method for providing telecommunication service includes receiving an incoming call request and generating a processing event, in response to the incoming call request. The method further includes transmitting the processing event to an operating space and notifying an agent that the processing event is stored in the operating space. Additionally, the method includes retrieving the processing event from the operating space with the agent and identifying a rule set with the agent. The rule set is associated with the processing event and includes one or more rules. The method further includes identifying a communication device based on the one or more rules; and forwarding the incoming call request to the communication device based on the one or more rules.

22 Claims, 3 Drawing Sheets

CALL SCREENING AGENT

TECHNICAL FIELD OF THE INVENTION

This invention relates in general to telecommunication systems, and more particularly to distributed processing of telephony communication.

BACKGROUND OF THE INVENTION

Recent years have seen an explosion in the uses of telecommunication service. As telecommunications use continues to rapidly grow, the need for fast and efficient call processing increases. Additionally, there exists a need for flexible, user-specific telecommunication processing.

SUMMARY OF THE INVENTION

In accordance with the present invention, techniques for operating a call-screening agent are provided. According to particular embodiments, these techniques enable distribution of telephony processing among various agents distributed within a system. Particular embodiments access a rule set to process communications.

In accordance with the present invention, the disadvantages and problems associated with telecommunications have been substantially reduced or eliminated. In particular, customized, rule-based processing and routing of calls is provided.

Technical advantages of certain embodiments include robust and scalable service provision for both voice and data. Other technical advantages of certain embodiments include flexible rule-based service provision that can be personalized for particular users and distributed processing that allows for more efficient use of processing resources.

Additional technical advantages of the present invention will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
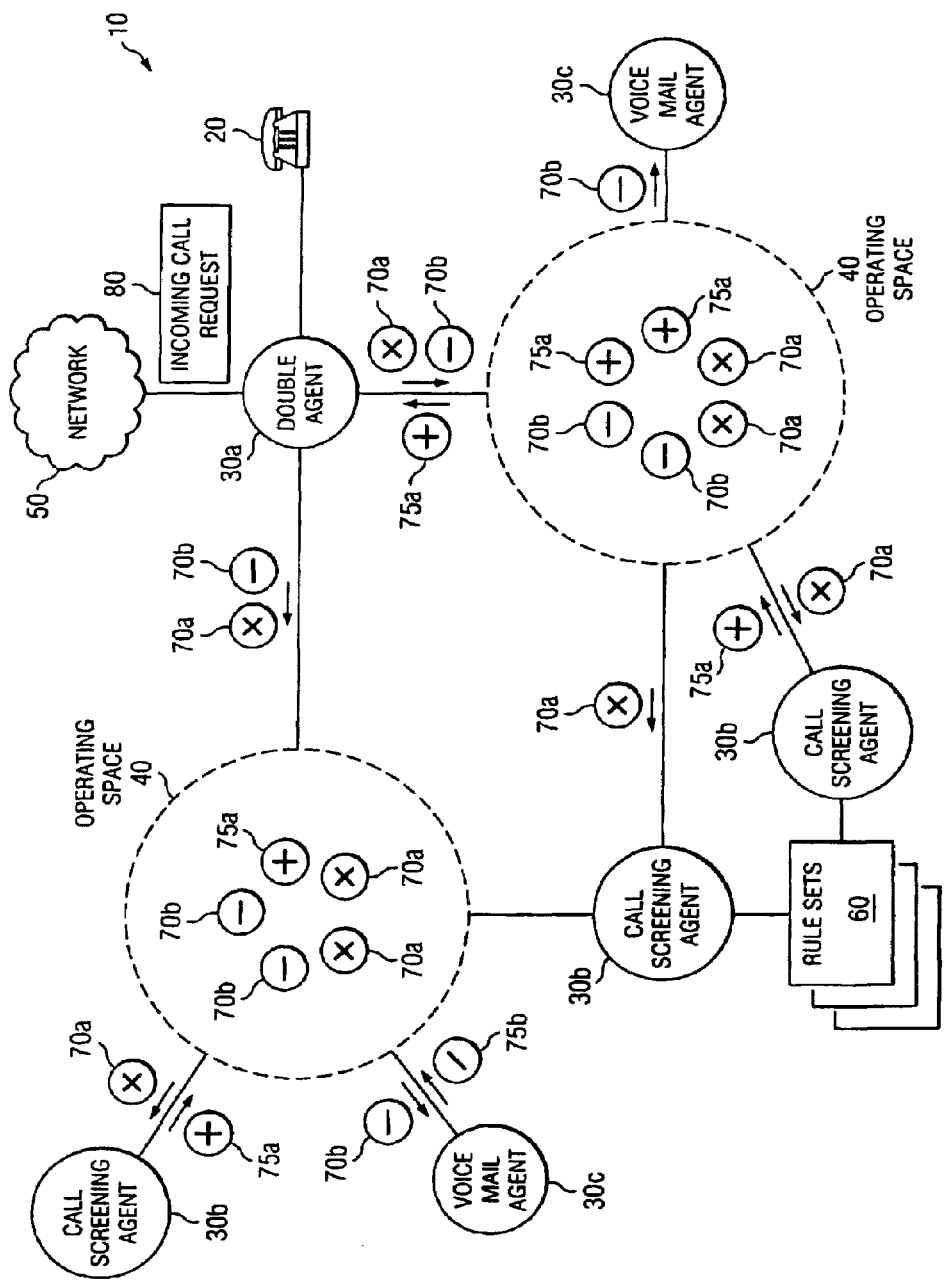
FIG. 1 illustrates a communication system including a device, various agents, and an operating space that provide telephony services according to particular embodiments of the present invention.

FIG. 1 illustrates a system 10 that provides telephony service. System 10 includes a device 20, agents 30, operating space 40, rule sets 60, and network 50. System 10 utilizes processing capabilities of agents 30 to provide telecommunication service to devices 20 based on rule sets 60. Rule sets 60 provide guidelines for routing, initializing, and otherwise handling calls received by system 10 for devices 20.

Device 20 represents any equipment, including appropriate controlling logic, suitable for providing voice, video, or data service to a user. For example, device 20 may be an appropriately enabled phone, computer, fax, or other suitable device. Device 20 includes user interface and network interface components allowing device 20 to interact, respectively, with users and network 50. Although system 10, as illustrated, contains only one device 20 coupled to double agent 30a, particular embodiments may include any suitable number of devices 20 coupled in various configurations to other components of system 10.

Agents 30 provide telephony and other services to device 20 by processing calls received from network 50 for devices 20. In a particular embodiment, agents 30 may also process outgoing call requests sent by devices 20. Agents 30 may be software applications or other computer processes running on appropriate hardware, such as the server 100 illustrated in FIG. 2. System 10 may include any number of agents 30 as appropriate based on the configuration and characteristics of the particular embodiment. In a particular embodiment, agents 30 represent processes running on networked servers in accordance with Sun Microsystems' Jini architecture. In such an embodiment, a management process may monitor agents 30 and adjust the number and type of agents 30 operating as warranted by the circumstances associated with system 10. For example, if a server hosting an agent 30 is disabled, the management process may launch another agent 30 on one of the remaining servers to replace the lost agent 30.

In the embodiment illustrated, system 10 includes particular agents 30, such as double agent 30a, call screening agent 30b, and voicemail agent 30c. Double agent 30a receives incoming call requests 80 from network 50 and transmits information from the incoming call requests 80 to operating space 40 in the form of events 70. Call screening agent 30b processes one type of events 70, device events 70a, to provide communication services to device 20. Voicemail agent 30c processes another type of event 70, voicemail events 70b, to provide callers voicemail service.

A particular embodiment of system 10 may include any, all, or none of these agents 30 as appropriate for the purpose and characteristics of the particular embodiment. Additionally, the functionality assigned to each type of agent 30 may vary depending on the configuration and characteristics of system 10. Furthermore, system 10 may be modified to include any appropriate type of agents 30 and utilize any appropriate type of events 70 depending on the requirements and characteristics of system 10. For example, in a particular embodiment, system 10 may include fax agents 30 that retrieve from operating space 40 and process fax events 70 representing calls placed to a fax device 20 on system 10.

Operating space 40 stores events 70 received from various agents 30 until other agents 30 retrieve the events 70 for processing. Operating space 40 may be any storage space appropriate for caring out the functions described. Operating space 40 may represent a storage device, a portion of a storage device, or multiple storage devices. Additionally, operating space 40 may be a dedicated memory allotment or may be allotted dynamically by system 10 at run time. In a particular embodiment, operating space 40 represents a Javaspace. Storage space 60 may be hosted by a server of the type illustrated below in FIG. 2.

Rule sets 60 includes one or more rules for processing calls in system 10. Rule set 60 may represent a file that contains the rules, a software applet that implements the rules, or any other suitable component capable of providing agents 30 with rules for processing calls on system 10. Rule sets 60 may be located local to each agent 30, stored in a central location coupled to network 50, or arranged according to any other suitable configuration. In a particular embodiment, rule sets 60 include a plurality of XML files, each associated with a particular user of system 10 and stored on a central server.

Network 50 represents any hardware and/or software configured to communicate information in the form of packets, cells, frames, segments, or other portions of data. Network 50 may include routers, hubs, switches, gateways, or any other suitable components in any suitable form or arrangement. Network 50 may also include any combination of public or private communications equipment such as elements of a public switched telephone network (PSTN), a global computer network such as the Internet, a local area network (LAN), a wide area network (WAN), or other appropriate communications equipment.

In operation, agents 30 provide telecommunication services to device 20 based on rule sets 60. The specific operation of system 10 depends on the particular characteristics and configuration of system 10. In the illustrated embodiment, double agent 30a receives an incoming call request 80 from network 50 indicating a call directed to a user of system 10 or a device 20 on system 10. In a particular embodiment, incoming call request 80 may represent a SIP invitation or any other appropriate signal associated with the initiation of a call on system 10. Double agent 30a may extract information from incoming call request 80 such as the telephone number or the identity of the user to which incoming call request 80 was originally directed. If double agent 30a extracts a telephone number from incoming call request 80, double agent 30a may use the telephone number to determine the type of device 20 to which incoming call request 80 was directed. For example, double agent 30a may reference a table of devices 20 registered on system 10 to determine that the phone number is associated with the primary telephone of a user, a voicemail account of a user, or a fax machine operating on system 10.

Double agent 30a generates an event 70 and communicates the event 70 to operating space 40. Event 70 is a file, record, or any other suitable collection of data that may include information from incoming call request 80. In the illustrated embodiment, event 70 represents a record including information identifying the device 20 or user to which the call was placed. Furthermore, in a particular embodiment, double agent 30a is capable of creating multiple types of events 70 under various circumstances to be processed by appropriate agents 30. For example, in the illustrated embodiment, double agent 30a generates a device event 70a if incoming call request 80 indicates a call for a device 20, or a voicemail event 70b if incoming call request 80 indicates a call for a voicemail account on system 10. After generating event 70, double agent 30a places event 70 in operating space 40.

Upon receiving event 70, operating space 40 notifies appropriate agents 30 that event 70 is available. In a particular embodiment, agents 30 may register with operating space 40 to request notification when a particular type of event 70 is available in operating space 40. For example, in the illustrated embodiment, when call screening agents 30b are initiated, each call screening agent 30b registers with one or more operating spaces 40 to be notified when that operating space 40 receives a device event 70a. Similarly, in the illustrated embodiment, when voicemail agents 30c are initiated, each voicemail agent 30c registers with one or more operating spaces 40 to be notified when the operating space 40 receives a voicemail event 70b.

After operating space 40 notifies the appropriate agents 30, one of the notified agents 30 retrieves the event 70 from operating space 40 for processing. For example, in the illustrated embodiment, when operating space 40 receives a device event 70a, operating space 40 notifies call screening agents 30b of the receipt of a new device event 70a. A particular call screening agent 30b then retrieves the device event 70a for processing. System 10 may use any appropriate guidelines for determining which notified agent 30 retrieves event 70 for processing in a particular case. For example, operating space 40 may allow the first available agent 30 responding to notification to retrieve the event 70 for processing.

Once a particular agent 30 retrieves event 70, the agent 30 identifies a rule set 60 to use in processing event 70. Depending on the characteristics and configuration of system 10, the appropriate rule set 60 may be identified based on the telephone number or the user to which the call was placed, the type of device calling, or any other suitable information.

The identified rule set 60 provides guidelines for processing the call associated with event 70 based on various factors. These factors may include the type of event 70 involved, the user associated with event 70, the existence of relevant system-wide guidelines, or any other appropriate considerations. Based on these factors, rule set 60 may provide any type of guidelines for routing and/or connecting the call associated with event 70. Examples of such guidelines may include determining the device 20 to which the call should be routed, the type of ring to use, or an appropriate voicemail greeting to provide the caller. The contents of an exemplary rule set 60 are discussed in greater detail in connection with FIG. 3.

After processing event 70, agent 30 may generate a processed event 75 and place processed event 75 in operating space 40. Processed event 75 is a file, record, or any other suitable collection of data that may include information from the original event 70 and guidelines provided by rule set 60, such as an indication of the device 20 to which the call should be routed, the type of ring that should be used for the call, or any other appropriate information from rule set 60. In the illustrated embodiment, processed event 75 includes information identifying the particular device 20 to which the call associated with the original event 70 should be routed. For example, call screening agent 30b may determine based on rule set 60 that a particular call should be routed to a conference room because of the time and day the call was received. In this example, processed event 75 may then contain information identifying a device 20 located in that conference room.

As with events 70, processed events 75 may represent a variety of processed event types in a particular embodiment, such as processed device event 75a and processed voicemail event 75b. For certain incoming call requests 80, processed event 75 may represent a different event type from the event 70 that agent 30 initially retrieved from operating space 40. For example, during processing, call screening agent 30b may determine based on the identified rule set 60 that the call associated with device event 70a should be forwarded to a voicemail account. Consequently, the processed event 75 may represent a processed voicemail event 75b.

After agent 30 places processed event 75 in operating space 40, operating space 40 may notify one or more double agents 30a that a new processed event 75 has been received by operating space 40. In a particular embodiment, operating space 40 notifies only double agents 30a who have subscribed to the operating space 40 requesting notification. Alternatively, in a particular embodiment, each double agent 30a is associated with a particular device 20 and operating space 40 notifies only the particular double agent 30a associated with the device for which processed event 75 is intended.

Upon being notified of the new processed event 75, the notified double agent 30a retrieves processed event 75. System 10 may be configured such that, if operating space 40 notifies more than one double agent 30a, a predetermined procedure is used to determine which double agent 30a will retrieve the new processed event 75. For example, the first double agent 30a to respond to the notification may be allowed to retrieve the processed event 75.

After retrieving processed event 75, double agent 30a extracts information from processed event 75 and uses the information to connect the call associated with processed event 75. In a particular embodiment, this information may identify the device 20 to which the call should be routed. In such an embodiment, double agent 30a may then notify the device 20 of the incoming call and forward processed event 75, incoming call request 80, or any other appropriate information to device 20 to facilitate the connection of the call. The double agent 30a may then hand off management of the call to device 20. As noted above, in various embodiments of system 10, processed event 75 may include various guidelines for connecting the call based on the contents of rule set 60. Depending on the characteristics and configuration of system 10, double agent 30a may use any of this information in any appropriate fashion to connect the call. After connecting incoming call request 80 to device 20, double agent 30a may then yield control of incoming call request 80 to device 20 to manage and ultimately terminate. Alternatively, double agent 30a may retain control of the call throughout the duration of the call and may provide additional processing as the call proceeds. For example, double agent 30a may send a ring signal to the designated device 20. If double agent 30a does not receive, in response to the ring signal, an offhook signal from the device 20 within a predetermined period of time, the double agent 30a may generate voicemail event 70b and store voicemail event 70b in operating space 40. Voicemail agent 30c may then retrieve and process voicemail event 70b to provide voicemail service to the caller.

While the illustration and the preceding description focus on a particular embodiment of system 10 that includes specific elements providing particular functions, system 10 contemplates individual components having any suitable combination and arrangement of elements providing telephony services to device 20 by implementing rules included in rule sets 60. Thus, the functions performed by the particular elements illustrated may be separated or combined as appropriate.

For example, in a particular embodiment, the functionality provided by call screening agent 30a in the above description may be divided between a number of different agents 30, each responsible for processing a subset of the rules included in rule set 60 associated with device event 70a. In such an embodiment, the processing of device event 70a proceeds in stages and, after each stage, agent 30 associated with the particular stage stores an event 70 in operating space 40 to be retrieved and processed by agent 30 associated with the next stage of processing.

Figure 2:
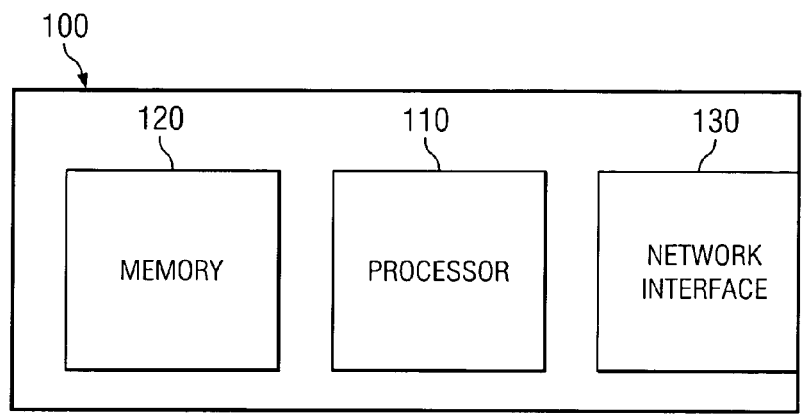
FIG. 2 is a block diagram illustrating an exemplary server for hosting agents and operating spaces utilized in particular embodiments of the communication system.

FIG. 2 illustrates exemplary components of a server 100 that hosts agents 30, service spaces 60, and/or rule sets 60 according to a particular embodiment of system 10. Server 100 may include a processor 110, a memory 120, and an interface 130.

Processor 110 executes instructions associated with the operation of agents 30, the maintenance of service spaces 60, and the processing of rule sets 60. Processor 100 may be a general purpose computer, dedicated microprocessor, or other processing device capable of communicating electronic information, including appropriate controlling logic. Examples of processor 100 include application-specific integrated circuits (ASICs), field-programmable gate arrays (FPGAs), digital signal processors (DSPs) and any other suitable specific- or general-purpose processors.

Memory 120 stores events 70, processed events 75, rule sets 60, and any other suitable information associated with operation of system 10. Memory 110 may comprise any collection and arrangement of volatile or non-volatile, local or remote devices suitable for storing data, such as for example random access memory (RAM) devices, read only memory (ROM) devices, magnetic storage devices, optical storage devices, or any other suitable data storage devices.

Interface 130 facilitates communication between server 100, other servers 100, network 50, and other communications equipment. Interface 130 may provide agents 30 and operating space 40 with an interface to network 50 and other servers 100. Interface 130 may include any combination of appropriate software and/or hardware for supporting communication.

In operation, processor 110 may host one or more agents 30. In a particular embodiment, processor 110 manages the operation of agents 30 locally and determines when to launch additional agents 30 or terminate existing agents 30. Processor 110 may be configured to maintain a predetermined number of each type of agent 30, adjust the number and type of agents 30 running based on the needs and operating characteristics of system 10, or manage agents 30 in any other suitable fashion. In another embodiment, a single processor 110 may be responsible for managing the operation of agents 30 for all of system 10. As noted above with respect to FIG. 1, a management process running on processor 110 of a particular server 100 may monitor the number and types of agents 30 available on system 10 and launch or terminate agents 30 on particular servers 100 as appropriate. The management process may interact with individual servers 100 using interface 130 of controlling server 100 hosting the management process and interface 130 of the controlled server 100. Such a management process may similarly be configured to maintain a predetermined number of each type of agents 30, adjust the number and type of agents 30 based on the needs and operating characteristics of system 10, or manage agents 30 in any other suitable fashion.

Memory 120 hosts operating spaces 40. Depending on the configuration and characteristics of system 10, memory 120 may host a single operating space 40, host multiple operating spaces 40, or be combined with other memories 120 to host a single multi-server operating space 40. Additionally, in a particular embodiment, processor 110 locally manages operating spaces 40 available in memory 120. In another embodiment, a management process running on the processor of a particular server 100 may monitor the number and size of operating spaces 40 available on system 10 and launch or terminate operating spaces 40 on particular servers 100 as appropriate. The management process may interact with individual servers 100 using interface 130 of the controlling server 100 hosting the management process and interface 130 of the controlled server 100. In a particular embodiment, when processor 110 or a management process launches new operating spaces 40, the new operating space 40 registers with a lookup service, a computer process running on a processor 110 in a server 100 on system 10. The lookup service then broadcasts the location of the new operating space 40 to agents 30 running on servers 100 in communication with the server 100 of the new operating space 40.

While the illustrated embodiment of server 100 hosts both agents 30 and operating spaces 40, system 10 contemplates any suitable distribution of agents 30 and operating spaces 40. For example, in a particular embodiment of system 10, certain servers 100 may exclusively host agents 30, while other servers 100 may exclusively host operating spaces 40.

Figure 3:
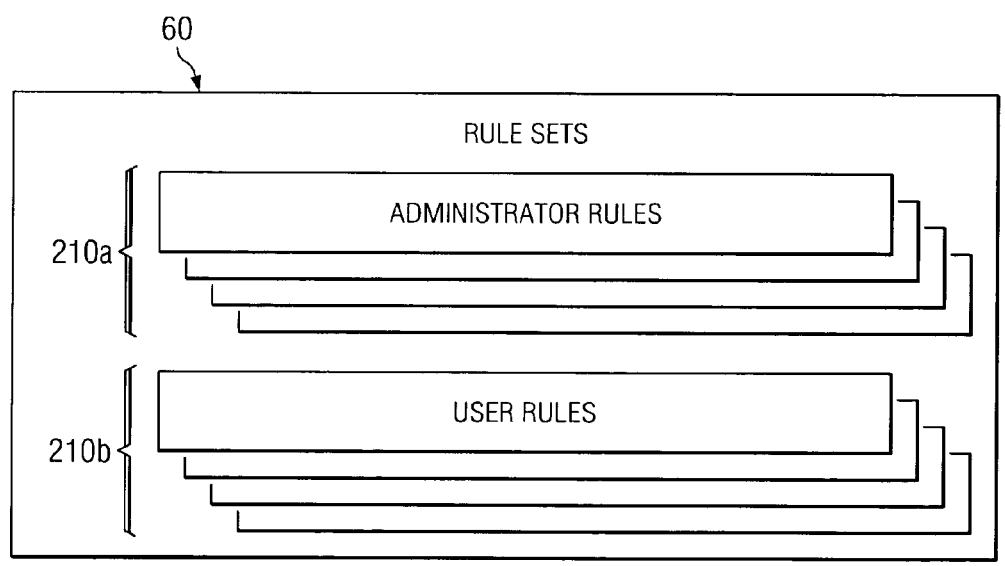
FIG. 3 is a block diagram illustrating exemplary components of a rule set.

FIG. 3 illustrates a block diagram of an exemplary rule set 60 according to a particular embodiment. In a particular embodiment, rule set 60 represents an XML file containing rules 210 for processing calls to various users of system 10. Rules 210 may represent instructions of any form that guide processing of calls. Rules 210 may define parameters needed for processing a particular call. For example, in a particular embodiment of rule set 60, a rule 210 may identify the telephone located in the office of a particular user associated with the particular rule set 60. Rules may determine a processing action to be taken based on one or more contingencies or the value of certain parameters. For example, a rule 210 may direct a call to a pager if the call is received after a certain time of day. In general, rules 210 may provide information in any appropriate form to be used by agent 30 to process calls on system 10.

In operation, an agent 30 utilizes rule set 60 to process calls. If rule set 60 represents a file, agent 30 may load rule set 60 and process instructions included in rule set 60. If rule set 60 represents an application, agent 30 may issue a call to rule set 60 to instruct rule set 60 to apply rules 210 to a particular call. In general, agent 30 may utilize rule set 60 in any appropriate manner based on the configuration and characteristics of rule set 60 and system 10.

Rules 210 may be structured to include any number of hierarchical levels with higher level rules 210 receiving higher precedence in processing. For example, the illustrated embodiment includes administrator rules 210a and user rules 210b. When agent 30 processes the illustrated embodiment of rule set 60, agent 30 may give precedence to administrator rules 210a. As a result, agent 30 may ignore user rules 210b that contradict administrator rules 210a. Alternatively, rules 210 may contain a single level of hierarchy with agent 30 giving all rules 210 equal weight. In general, although FIG. 3 illustrates a rule set 60 that includes two levels of hierarchy, rule set 60 may contain no hierarchy or may include any number of hierarchical levels as appropriate for system 10.

Additionally, agent 30 may process rules 210 within a particular hierarchical level one at a time, simultaneously, or in any other appropriate manner. For example, agent 30 may apply each rule 210 in rule set 60 in the order provided by rule set 60. Alternatively, agent 30 may apply every rule simultaneously with contradictory rules being reconciled according to a predetermined policy.

Figure 4:
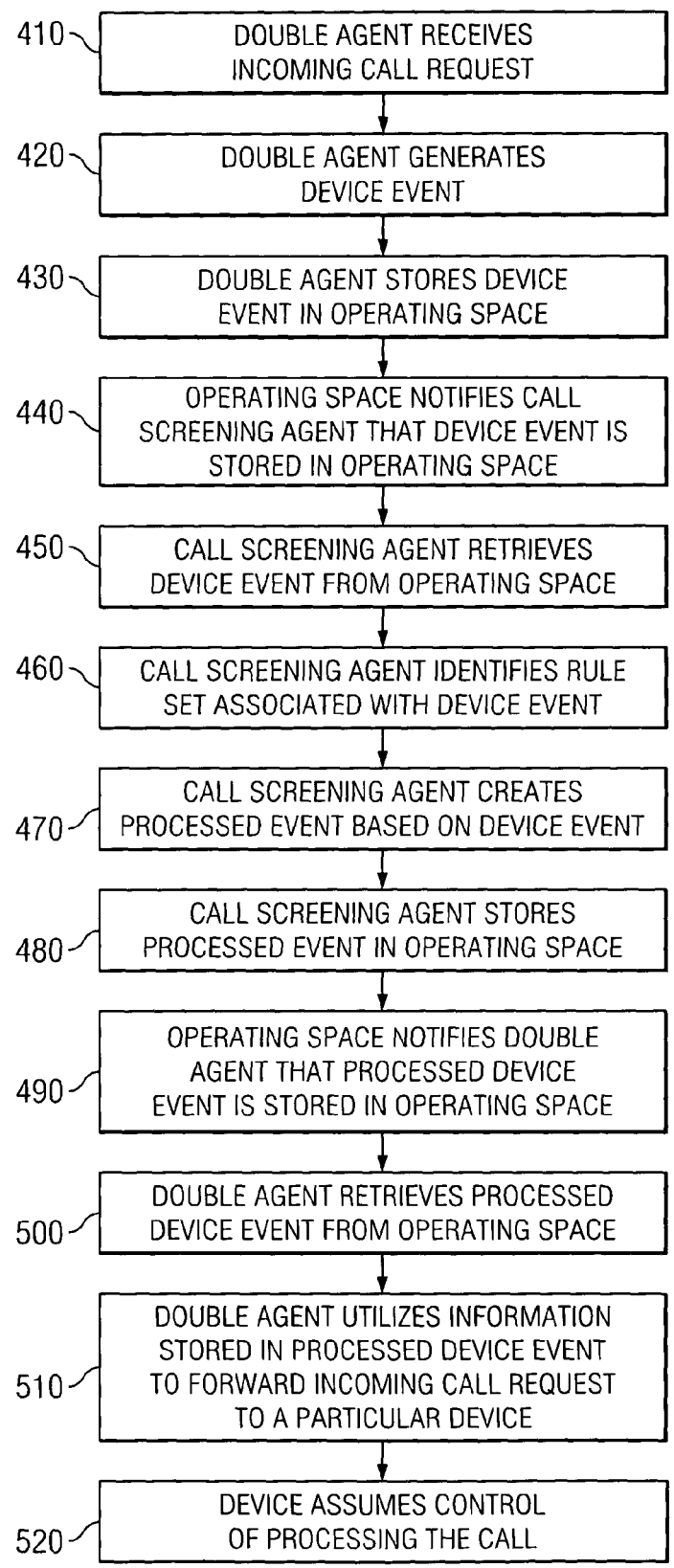
FIG. 4 is a flowchart illustrating a method for providing telephony services using a call screening agent.

FIG. 4 is a flow chart illustrating operation of system 10 according to a particular embodiment. Specifically, FIG. 4 illustrates operation of an embodiment similar to that illustrated in FIG. 1, an embodiment that includes double agents 30a and call screening agents 30b. In the embodiment described by FIG. 4, call screening agents 30b are responsible for processing device events 70a.

At step 410, double agent 30a receives incoming call request 80 for telephone device 20. Double agent 30a generates device event 70a in response to incoming call request 80 at step 420. Double agent 30a stores device event 70a in operating space 40 at step 430. At step 440, operating space 40 notifies call screening agent 30b that device event 70a is stored in operating space 40.

Call screening agent 30b retrieves device event 70a from operating space 40 at step 450. At step 460, call screening agent 30b identifies rule set 60 associated with device event 70a. At step 470, call screening agent 30b generates processed device event 75a based on device event 70a and rules 210 included in the rule set 60 associated with device event 70a. Call screening agent 30b stores processed device event 75a in operating space 40 at step 480. At step 490, operating space 40 notifies appropriate double agent 30a that processed device event 75a is stored in operating space 40.

Notified double agent 30a retrieves processed device event 75a from operating space 40 at step 500. At step 510, double agent 30a utilizes information included in processed device event 75a to forward incoming call request 80 to a particular device 20. At step 520, device 20 assumes control of processing the call associated with incoming call request 80.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for providing telecommunication service comprising:
   receiving an incoming call request;
   generating, with a first agent, a processing event, in response to the incoming call request;
   transmitting the processing event from the first agent to an operating space;
   notifying a second agent that the processing event is stored in the operating space;
   retrieving the processing event from the operating space with the second agent;
   identifying a rule set with the second agent, wherein the rule set is associated with the processing event, and wherein the rule set comprises one or more rules;
   identifying a communication device based on the one or more rules;
   generating a processed event that indicates the identified communication device;
   transmitting the processed event to the operating space;
   retrieving the processed event from the operating space with at least one of the first agent and a third agent; and
   forwarding the incoming call request to the identified communication device.

2. The method of claim 1, wherein the event comprises an event type and wherein notifying an agent comprises notifying an agent associated with the event type.

3. The method of claim 1, wherein the incoming call request identifies a user and wherein identifying a rule set comprises identifying a rule set associated with the user identified by the incoming call request.

4. The method of claim 1, wherein the rule set comprises a first hierarchical subset, comprising one or more rules, and a second hierarchical subset, comprising one or more rules, and wherein forwarding the incoming call request comprises forwarding the incoming call request based on the rules in the first hierarchical subset and based on any of the rules in the second hierarchical subset that do not contradict rules in the first hierarchical subset.

5. The method of claim 1, wherein the operating space comprises a Javaspace.

6. The method of claim 1, wherein forwarding the incoming call request comprises:
   deciding to route the incoming call request to a voicemail account based on the rule set;
   generating a voicemail event;
   placing the voicemail event in the operating space;
   notifying a voicemail agent that the voicemail event has been placed in the operating space; and
   forwarding the incoming call request to a voicemail system with the voicemail agent.

7. The method of claim 1, wherein forwarding the incoming call request comprises:
   transmitting a ring signal to a communication device;
   generating a voicemail event, if an offhook signal is not received within a predetermined time;
   placing the voicemail event in the operating space;
   notifying a voicemail agent that the voicemail event has been placed in the operating space; and
   forwarding the incoming call request to a voicemail system with the voicemail agent.

8. A computer program stored on a computer readable medium, the computer program operable to:
   receive an incoming call request;
   generate, with a first agent, a processing event, in response to the incoming call request;
   transmit the processing event from the first agent to an operating space;
   notify a second agent that the processing event is stored in the operating space;
   retrieve the processing event from the operating space with the second agent;
   identify a rule set with the second agent, wherein the rule set is associated with the processing event, and wherein the rule set comprises one or more rules;
   identify a communication device based on the one or more rules;
   generate a processed event that indicates the identified communication device;
   transmit the processed event to the operating space;
   retrieve the processed event from the operating space with at least one of the first agent and a third agent; and
   forward the incoming call request to the identified communication device.

9. The computer program of claim 8, wherein the processing event comprises an event type and wherein the computer program is further operable to notify an agent by notifying an agent associated with the event type.

10. The computer program of claim 8, wherein the incoming call request identifies a user and wherein the computer program is further operable to identify a rule set by identifying a rule set associated with the user identified by the incoming call request.

11. The computer program of claim 8, wherein the rule set comprises a first hierarchical subset, comprising one or more rules, and a second hierarchical subset, comprising one or more rules, and wherein the computer program is further operable to forward the incoming call request by forwarding the incoming call request based on the rules in the first hierarchical subset and based on any of the rules in the second hierarchical subset that do not contradict rules in the first hierarchical subset.

12. The computer program of claim 8, wherein the operating space comprises a Javaspace.

13. The computer program of claim 8, wherein the computer program is further operable to forward the incoming call request by:
   deciding to route the incoming call request to a voicemail account based on the rule set;
   generating a voicemail event;
   placing the voicemail event in the operating space;
   notifying a voicemail agent that the voicemail event has been placed in the operating space; and
   forwarding the incoming call request to a voicemail system with the voicemail agent.

14. The computer program of claim 8, wherein the computer program is operable to forward the incoming call request by:
   transmitting a ring signal to a communication device;
   generating a voicemail event, if an offhook signal is not received within a predetermined time;
   placing the voicemail event in the operating space;
   notifying a voicemail agent that the voicemail event has been placed in the operating space; and
   forwarding the incoming call request to a voicemail system with the voicemail agent.

15. A system for providing telecommunication service comprising:
   means for receiving an incoming call request;
   means for generating, with a first agent, a processing event, in response to the incoming call request;
   means for transmitting the processing event from the first agent to an operating space;
   means for notifying a second agent that the processing event is stored in the operating space;
   means for retrieving the processing event from the operating space with the agent;
   means for identifying a rule set with the second agent, wherein the rule set is associated with the processing event, and wherein the rule set comprises one or more rules;
   means for identifying a communication device based on the one or more rules;
   means for generating a processed event that indicates the identified communication device;
   means for transmitting the processed event to the operating space;
   means for retrieving the processed event from the operating space with at least one of the first agent and a third agent; and
   means for forwarding the incoming call request to the identified communication device.

16. A system for providing telecommunication service comprising:
   an operating space operable to store events;
   a first agent operable to:
      receive an incoming call request;
      generate a processing event, in response to the incoming call request;
      transmit the processing event to the operating space;
      notify a second agent that the processing event is stored in the operating space; and
   a second agent operable to:
      retrieve the processing event from the operating space;
      identify a rule set associated with the processing event, wherein the rule set comprises one or more rules;

identify a communication device based on the one or more rules;

generate a processed event that indicates the identified communication device; and transmit the processed event to the operating space, wherein at least one of the first agent and a third agent is operable to retrieve the processed event from the operating space and forward the incoming call request to the identified communication device.

17. The system of claim 16, wherein the event comprises an event type and wherein the first agent is operable to notifying a second agent by notifying a second agent associated with the event type.

18. The system of claim 16, wherein the incoming call request identifies a user and wherein the first agent is operable to identify a rule set by identifying a rule set associated with the user identified by the incoming call request.

19. The system of claim 16, wherein the rule set comprises a first hierarchical subset, comprising one or more rules, and a second hierarchical subset, comprising one or more rules, and wherein the at least one of the first agent and a third agent is operable to forward the incoming call request by forwarding the incoming call request based on the rules in the first hierarchical subset and based on any of the rules in the second hierarchical subset that do not contradict rules in the first hierarchical subset.

20. The system of claim 16, wherein the operating space comprises a Javaspace.

21. The system of claim 16, wherein the at least one of the first agent and a third agent is operable to forward the incoming call request by:

deciding to route the incoming call request to a voicemail account based on the rule set;

generating a voicemail event;

placing the voicemail event in the operating space;

notifying a voicemail agent that the voicemail event has been placed in the operating space; and forwarding the incoming call request to a voicemail system with the voicemail agent.

22. The system of claim 16, wherein the at least one of the first agent and a third agent is operable to forward the incoming call request by:

transmitting a ring signal to a communication device;

generating a voicemail event, if an offhook signal is not received within a predetermined time;

placing the voicemail event in the operating space;

notifying a voicemail agent that the voicemail event has been placed in the operating space; and forwarding the incoming call request to a voicemail system with the voicemail agent.

* * * * *